UNITED STATES PATENT OFFICE.

JOHN SAUNDERS, OF HOVE, ENGLAND.

MANUFACTURE OF BRICKS, TILES, SLABS, &c.

SPECIFICATION forming part of Letters Patent No. 672,240, dated April 16, 1901.

Application filed September 2, 1899. Serial No. 729,297. (No specimens.)

*To all whom it may concern:*

Be it known that I, JOHN SAUNDERS, a citizen of England, residing at No. 24 Arthur street, Hove, in the county of Sussex, England, have invented certain new and useful Improvements in the Manufacture of Bricks, Tiles, Slabs, and the Like, (for which I have applied for a patent in Great Britain, dated February 13, 1899, No. 3,205,) of which the following is a specification.

My invention relates to the manufacture of bricks, tiles, slabs, and the like of material that requires no burning. For this purpose I grind together sand, gravel, clinkers, and the like with Portland cement and alum in various proportions. I find a good proportion is about sixteen parts, by weight, of the sand or like material to one part, by weight, of cement and about one-tenth per cent. of alum. The ground material is mixed with water enough to make it into a paste fit for molding—say two to three per cent. This paste is molded to the desired forms, and these are kept in dry sheds for about a fortnight, after which they can be exposed to the weather and are fit for building purposes.

When red bricks are required, I add to the mixture above described about equal quantities of Venetian red and red oxid of iron, making up together about the same weight as that of the cement employed.

For yellow bricks the mixture has added to it about the same proportion of yellow ocher.

Having thus described the nature of this invention and the best means I know of carrying the same into practical effect, I claim—

A composition for bricks, tiles, &c., consisting of about sixteen parts of sand, one part of Portland cement and one-tenth of a part of alum substantially as described.

In testimony whereof I have hereunto set my hand in presence of two subscribing witnesses.

JOHN SAUNDERS.

Witnesses:
H. D. JAMESON,
F. L. RAND.